(12) United States Patent
Pesce et al.

(10) Patent No.: US 9,416,582 B2
(45) Date of Patent: *Aug. 16, 2016

(54) INSULATING GLAZING

(75) Inventors: Lorenzo Pesce, Brussels (BE); Eric Tixhon, Crisnee (BE)

(73) Assignee: AGC Glass Europe, Brussels (BE)

(*) Notice: Subject to any disclaimer, the term of this patent is extended or adjusted under 35 U.S.C. 154(b) by 763 days.

This patent is subject to a terminal disclaimer.

(21) Appl. No.: 13/805,542

(22) PCT Filed: Jun. 23, 2011

(86) PCT No.: PCT/EP2011/060529
§ 371 (c)(1),
(2), (4) Date: Dec. 19, 2012

(87) PCT Pub. No.: WO2011/161204
PCT Pub. Date: Dec. 29, 2011

(65) Prior Publication Data
US 2013/0101760 A1   Apr. 25, 2013

(30) Foreign Application Priority Data
Jun. 24, 2010   (BE) .................................. 2010-0375

(51) Int. Cl.
*C03C 17/36* (2006.01)
*E06B 3/66* (2006.01)
(Continued)

(52) U.S. Cl.
CPC .............. *E06B 3/6612* (2013.01); *C03C 17/245* (2013.01); *C03C 17/2453* (2013.01); *C03C 17/3417* (2013.01); *C03C 17/36* (2013.01);
(Continued)

(58) Field of Classification Search
CPC   C03C 17/366; C03C 17/3681; C03C 17/253; C03C 17/2453; C03C 2217/24; C03C 2217/94; C03C 2217/948
See application file for complete search history.

(56) References Cited

U.S. PATENT DOCUMENTS 4,206,252 A   6/1980   Gordon
4,941,302 A * 7/1990   Barry ................... C03B 23/245
                                                        428/34
(Continued)

FOREIGN PATENT DOCUMENTS

EP   0 637 572   2/1995
EP   0 844 219   5/1998
(Continued)

OTHER PUBLICATIONS

"Method of manufacture of transparent heat-reflecting doped tin dioxide on glass," Chemical Abstracts, vol. 107, No. 24, Total 1 Page, (Dec. 1987) XP 002171526.
(Continued)

*Primary Examiner* — Samir Shah
*Assistant Examiner* — Zheren J Yang
(74) *Attorney, Agent, or Firm* — Oblon, McClelland, Maier & Neustadt, L.L.P.

(57) ABSTRACT

The invention relates to double glazing comprising at least one glass sheet that has a set of low-emission layers on each side, one side being coated with layers which are produced using sputtering and which include at least one metal layer that reflects infrared radiation. The other side of said at least one glass sheet comprises one or more metal oxide layers that are deposited using gas phase pyrolysis. The disclosed glazing has a minimum light transmittance of 60 percent (with 4 mm thick clear glass sheets).

20 Claims, 1 Drawing Sheet

(51) Int. Cl.
*C03C 17/245* (2006.01)
*C03C 17/34* (2006.01)
*E06B 3/67* (2006.01)

(52) U.S. Cl.
CPC ........... *C03C 17/366* (2013.01); *C03C 17/3644* (2013.01); *C03C 17/3681* (2013.01); *C03C 2217/24* (2013.01); *C03C 2217/241* (2013.01); *C03C 2217/244* (2013.01); *C03C 2217/94* (2013.01); *C03C 2218/365* (2013.01); *E06B 3/6715* (2013.01); *Y10T 428/24355* (2015.01); *Y10T 428/24942* (2015.01); *Y10T 428/24967* (2015.01)

(56) References Cited

U.S. PATENT DOCUMENTS

| | | | |
|---|---|---|---|
| 5,948,538 | A | 9/1999 | Brochot et al. |
| 6,797,388 | B1* | 9/2004 | Szanyi ............... C03C 17/3417 427/164 |
| 7,572,511 | B2* | 8/2009 | Hartig .................. C03C 17/36 428/428 |
| 7,891,154 | B2* | 2/2011 | Cording ............... A47F 3/0434 52/171.2 |
| 8,658,262 | B2* | 2/2014 | Myli ................... C03C 17/3411 428/34 |
| 2003/0066825 | A1 | 4/2003 | Leutner et al. |
| 2003/0113550 | A1* | 6/2003 | Millett .................. A47F 3/0434 428/432 |
| 2004/0169789 | A1 | 9/2004 | Mathey et al. |
| 2005/0252108 | A1 | 11/2005 | Sanderson et al. |
| 2006/0005484 | A1* | 1/2006 | Riblier .................. A47F 3/0434 52/204.5 |
| 2006/0046072 | A1 | 3/2006 | Ferreira et al. |
| 2006/0141265 | A1* | 6/2006 | Russo .................... C03C 17/36 428/426 |
| 2008/0128071 | A1 | 6/2008 | Murphy |
| 2008/0164788 | A1* | 7/2008 | Riblier .................. A47F 3/0434 312/116 |
| 2008/0280078 | A1 | 11/2008 | Krisko et al. |
| 2009/0011206 | A1* | 1/2009 | Schutz ................ C03C 17/3417 428/216 |
| 2009/0120496 | A1* | 5/2009 | Cording .............. C03C 17/3417 136/256 |
| 2009/0214880 | A1* | 8/2009 | Lemmer ........... B32B 17/10036 428/432 |
| 2010/0098888 | A1* | 4/2010 | Landon ................... C03C 27/10 428/34 |
| 2010/0247820 | A1 | 9/2010 | Krisko et al. |
| 2010/0255225 | A1* | 10/2010 | Cording .............. C03C 17/3417 428/34 |
| 2011/0023545 | A1* | 2/2011 | Liu ....................... C03C 17/002 65/60.2 |
| 2011/0146768 | A1* | 6/2011 | Lu ...................... C03C 17/3417 136/255 |
| 2011/0212279 | A1* | 9/2011 | Lemmer ............. C03C 17/3435 428/34 |
| 2011/0256325 | A1* | 10/2011 | Sanderson ........ B32B 17/10036 428/34 |
| 2012/0021149 | A1* | 1/2012 | Myli ................... C03C 17/3411 428/34 |
| 2012/0090246 | A1* | 4/2012 | Nunez-Regueiro ... A47F 3/0434 49/484.1 |
| 2013/0174892 | A1* | 7/2013 | Ganjoo ................... H01B 1/08 428/34 |
| 2014/0004283 | A1* | 1/2014 | Bouesnard .......... C03C 17/3417 428/34 |

FOREIGN PATENT DOCUMENTS

| | | |
|---|---|---|
| EP | 1 285 894 | 2/2003 |
| EP | 1 293 726 | 3/2003 |
| EP | 1230188 B1 * | 9/2003 |
| WO | 01 28949 | 4/2001 |
| WO | 03 007060 | 1/2003 |
| WO | 03 050056 | 6/2003 |

OTHER PUBLICATIONS

International Search Report Issued Sep. 21, 2011 in PCT/EP11/060529 Filed Jun. 23, 2011.
International Search Report issued Apr. 23, 2012 in PCT/EP12/053968 filed Mar. 8, 2012.

* cited by examiner

INSULATING GLAZING

The present invention relates to glazings that have thermally insulating properties. The invention relates in particular to glazings for which the properties are linked to the presence of transparent thin layers that act as selective filters for the wavelengths transmitted.

The production of glazings that offer low-emissivity properties constitutes a significant part of the improvements that target the reduction of the energy consumption for the heating of buildings. Increasing the number of the glass sheets incorporated into the composition of such insulating glazings is one means of improving their performances. It is not always possible for reasons of weight or size. Consequently, the improvement of the performances of the low-emissivity systems used remains a permanent objective.

The reduction of the emissivity must not significantly alter the other required properties of the insulating glazings in question. In particular, the glazings must retain a light transmission that is as high as possible and must not have an unacceptable color in reflection. By way of indication, the glazings must have a reflection that is as neutral as possible and above all must not have a purple coloration.

At the same time as the low-emissivity properties, depending in particular on the places of use of these glazings, other thermal properties are simultaneously desired. In regions in which it is advantageous to be able to take advantage of the solar energy to heat up the buildings, it is thus endeavored to have glazings for which the solar factor (SF or also g) is as high as possible. This solar factor is the sum of the solar energy transmitted directly by the glazing and of that which, after absorption, is reemitted toward the inside of the building.

Two main types of low-emissivity layers are used on the glass sheets. These are, on the one hand, layers obtained by gas pyrolysis. These layers are essentially based on oxides. On the other hand, use is made of systems of layers that comprise one or more metal layers that selectively reflect infrared radiation, metal layers that are part of a set comprising, furthermore, protective dielectric layers that control the selectivity of the filters formed. These systems are produced essentially by sputtering techniques.

The choice of the types of layers used in the insulating glazings depends on multiple criteria. Thus, the pyrolytic layers have the advantage of being obtained directly on the glass production lines. Their cost is much lower than that of the systems of layers deposited by sputtering. Furthermore, the pyrolytic layers are relatively "hard". They offer a good resistance to mechanical and/or chemical testing. However, these layers have performances as far as emissivity is concerned that remain much lower than those of the layers deposited by sputtering. Conversely, these layers deposited by sputtering are brittle—they are described as soft—and must consequently be protected.

The improvement of the emissivity of the layers deposited by sputtering results in ever more complex systems. It is a question in particular of the increase in the number of reflective metal layers, and at the same time of the dielectric layers that accompany them. The most complex systems consequently have a not inconsiderable cost which must be compared to the gain obtained in terms of insulation.

For the reasons disclosed above, a significant portion of insulating glazings consists of relatively simple glazings that comprise two glass sheets, one of which is coated with a system of layers obtained by sputtering, with a single thin metal layer. In order to protect this system of layers, the latter thin metal layer is positioned on one face of one of the sheets which is not exposed to external hazards, and is therefore turned toward the space located between the two sheets.

The regulations in the field of energy savings require the use of ever more effective glazings. For insulating glazings containing two glass sheets, the boundaries of the possibilities for improving the systems of layers are increasingly difficult to push back. The search for new solutions remains open.

The inventors have shown that a substantial improvement in the properties could be obtained by using glazings as defined in claim 1.

The choice of positioning, on one and the same glass sheet, a system of layers deposited by sputtering on one face and a pyrolytic layer on the other face surprisingly shows that it is possible to improve the thermal insulation coefficient $\underline{U}$, by simultaneously having a high solar factor $\underline{g}$, without objectionably degrading the other properties, especially the light transmission or the neutrality of the color in reflection. This result is even more remarkable since the presence of several systems of layers positioned on each of the two sheets as will be presented in the comparative examples does not make it possible to achieve this result.

It is also necessary to emphasize that the implementation of the invention requires methods that are not customary for the glass sheets comprising one or the other of these systems of layers.

Glass sheets, one face of which is coated with a system of layers obtained by pyrolysis, the other with a system of layers obtained by sputtering, have been proposed previously. These glass sheets were intended to be incorporated into the composition of domestic-use oven doors. In these applications, the sheets in question were part of a set comprising, for example, three glass sheets, at least one of which had this structure. In these applications, the essential property is of course to screen out infrared radiation. The light transmission, without being negligible, may be brought back to relatively modest values, for example of the order of 50% or less (measured according to the EN 410 standard). Likewise, the optical quality of these products is not comparable to that required in architectural glazings. In particular the haze that corresponds to the fraction of the light diffused by the glazing may be significantly greater for these applications. Likewise again, the colors in reflection are often reduced by the use, for the outermost glass sheet with respect to the oven, of a highly colored glass.

For these reasons, the properties required for these applications are much less restricting than those of architectural glazings, and the preparation techniques may follow relatively conventional methods.

In contrast to these prior propositions, the glazings according to the invention offer a light transmission which remains very high. This transmission must take into account the absorption linked to the thickness of the glass sheets. For clear glass sheets having a thickness of 4 mm, the transmission of the double glazing is not less than 60% of the incident light, the measurement being carried out for an illuminant D65 under an angle of 2°. For different thicknesses, this value must be corrected for the absorption characteristic of the glass.

The solar factor of the glazings according to the invention is also relatively high and advantageously greater than 45% (according to the EN 410 standard) and for clear glasses having a thickness of 4 mm.

The optional use of glazing comprising sheets of "extra-clear" glass inevitably results in the increase of the light transmission and of the solar factor in the proportions particular to this type of glass.

Still with respect to the prior techniques, the glazings according to the invention must have a haze that is as reduced as possible and in all cases this haze must not be greater than 0.7% and preferably not greater than 0.5% (measured for example according to the ASTM D1003-92 standard).

Remarkably, in the insulating double glazings according to the invention, the two systems of layers must be located on either side of the same glass sheet. The same layers distributed differently, as is shown in the examples, do not make it possible to achieve the same performances. This also results, for the reasons of relative strength of these systems of layers, in positioning the pyrolytic layers on an outer face of the double glazing, the layers obtained by sputtering thus being turned toward the space located between the glass sheets.

The set of pyrolytic layers is obtained conventionally in the installations for producing "float" glass, by applying the precursors of these layers directly to the ribbon of glass at high temperature.

Once the pyrolytic set is formed, the ribbon of glass is cut and the sheets are treated "off-line" in sputtering installations. In these operations, the sheet to be coated rests on a roller conveyor as it progresses under the various cathodes used to form the various layers. The face in contact with the rollers is the one previously coated by pyrolysis. Despite its relative hardness, the contact of the layer with the rollers is capable of imprinting rubbing marks on this layer, the surface of which is relatively rough. These marks are of no great importance for "oven" applications. They are not acceptable for architectural glazings.

The pyrolytic layers, due to the very fact of their surface roughness, also ordinarily have a not inconsiderable haze. In order to attenuate these surface irregularities, it is known to carry out a polishing of these layers. From experience, the use of such polishing makes it possible, according to the invention, to remove most of the roughness that is the source of the rubbing marks generated during the transportation operation in the sputtering deposition installations.

According to the invention, it is therefore desirable, once the pyrolytic layer is formed, and preferably before carrying out the deposition by sputtering, to subject each layer to the polishing in question. The polishing of the pyrolytic layer is advantageously such that the roughness Ra after polishing is not greater than 10 nm and preferably not greater than 6 nm.

In practice, the polishing substantially reduces the haze introduced by the presence of the pyrolytic layer. Initially, depending on the pyrolytic layers considered, this haze lies approximately between 0.4% and 0.8% of the transmitted light. Although it is commonly acknowledged that glazings for architectural applications must not have a haze greater than 0.7%, the polishing carried out under known conditions makes it possible to reduce the haze preferably to a value less than or equal to 0.5% and preferably less than or equal to 0.3%.

In order to arrive at the best performances, it is necessary in the glazings according to the invention to simultaneously use the best pyrolytic layers and the best layers deposited by sputtering. For the pyrolytic layers, use is advantageously made of a layer based on doped tin oxide. As is known, the dopant is either fluorine or antimony.

Still as is known, the layer of doped tin oxide must have a certain thickness. This thickness guarantees a selective action on infrared radiation while making it possible to maintain a good neutrality of color in reflection. This thickness is at least 200 nm, but the neutrality is at best only for discrete thicknesses which may vary as a function of the exact nature of the composition of these layers.

In order to improve, in particular, the neutrality in reflection of the pyrolytic layers and favor the light transmission, it is known to combine with the layer constituting the infrared filter, at least one other layer located under the first and having a refractive index intermediate between that of the glass substrate and that of the layer that selectively filters infrared radiation. These layers favor, in particular, the neutralization and the suppression of color variations depending on the angle of observation. Known conventional layers consist of oxides, or combinations of layers of oxides, in particular of sets of layers of titanium oxide and of silicon oxide, or of tin oxide and silicon oxide or of silicon oxycarbide $SiOxCy$. These layers, or sets of layers, are also produced by direct pyrolysis on the ribbon of glass in float glass installations or at the outlet thereof.

The best arrangements regarding the pyrolytic layers, such as those indicated above, result for these systems in emissivity values that, for an application on a sheet of ordinary clear float glass having a thickness of 4 mm, are not greater than 0.20 and preferably not greater than 0.15, and particularly preferably are less than or equal to 0.10.

Although the forming of the pyrolytic layer imposes some precautions, the same is true as regards the layers formed by sputtering. In particular, the face of the glass on which the deposition is carried out is inevitably that in contact with the tin bath in the manufacture of the glass sheet. It is known that this face is capable of reacting with the layers deposited. Diffusions may take place that adversely affect the quality of the layers in question. For this reason, when a single system of layers is present on a glass sheet, it is endeavored to carry out the deposition on the "air" face of the glass sheet.

For the sheets according to the invention, the only face available for the deposition is the "tin" face. It is therefore preferable for the system of layers deposited to be protected against possible impairment due to undesirable diffusions. Advantageously, this protection is provided by means of layers interposed between the infrared-reflecting metal layer and the glass sheet. Protective layers are, for example, layers based on $SiO_2$, $Si_3N_4$, or any other layer known for this type of property, in particular layers based on tin oxide or on oxides of a zinc/tin alloy.

As indicated above, it is necessary to form a set by sputtering which is as high-performance as possible as regards emissivity without requiring the use of expensive systems. In particular, it is preferred, for the latter reason especially, to use a system of layers that comprises only a single layer of silver. When a single silver-based layer is present in these systems, this layer has a thickness which is from 10 to 15 nm.

The systems of layers obtained by sputtering which are simultaneously neutral in reflection and have the best emissivities, make it possible to achieve emissivities less than or equal to 0.01. These systems are very substantially more effective than the pyrolytic systems mentioned above.

The combination of the systems of layers according to the invention makes it possible to achieve particularly low thermal coefficient values, while simultaneously having a sufficient solar factor.

The commercial classifications of glazings are the subject of standards and are generally based on the values of the U coefficients. The glazings according to the invention make it possible to cross thresholds that were hitherto inaccessible for double glazing of the type considered. Thus, for a glazing composed of two clear glass sheets having a thickness of 4 mm each, separated by 15 mm, the space being filled with a gas mixture comprising 90% argon, the U coefficients achieved according to the invention may be equal to 0.9 $W/m^2 \cdot K$ (EN 673 standard).

Still for the double glazings according to the invention with sheets of ordinary clear glass having a thickness of 4 mm, comprising the best systems of layers, the solar factor obtained is at least 45%.

The choice of the nature of the layers and of their thicknesses is such that with an illuminant D65 and under 2°, the glazings according to the invention, for the same thicknesses of 4 mm, have in reflection toward the outside colorimetric coordinates in the CIELAB system that are advantageously:

$$-6 \leq a^* \leq 3$$

$$-6 \leq b^* \leq 3.$$

The invention is described in detail by referring to the page of drawings in which.

Figure 1:
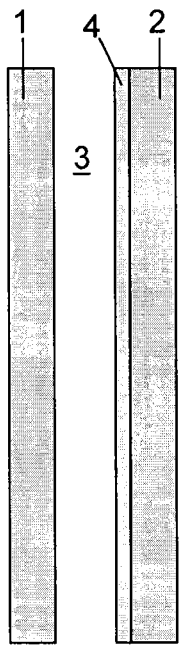
FIG. 1 is a schematic cross-sectional view representing an insulating glazing from the prior art.

The most common insulating glazings at the present time are of the type represented in FIG. 1. They consist of two glass sheets (1, 2) that trap, in an enclosed space, a gas-filled cavity (3), most frequently filled with argon chosen for its low thermal conductivity coefficient. The faces of the glass sheets are conventionally numbered beginning with that turned toward the outside of the building. A system of low emissivity layers (4) is applied at position 3. This system usually consists of a set comprising a thin metal layer, most often based on silver, this layer being within a set of dielectric layers that protects the metal layer. The metal layer selectively reflects infrared radiation. The dielectric layers protect the metal layer against various degradations originating, for example, from diffusion of ions from the glass sheet, or of oxygen at the time of the production of the layers superposed on the metal layer or subsequent to this production, especially during heat treatments. The dielectric layers also have the role of limiting the reflection of the rays of visible wavelengths, and of maintaining a neutrality of color in reflection.

The highest performing systems of layers for the low-emissivity properties are of the type deposited by sputtering. These systems that are sensitive to mechanical attacks are positioned in the space located between the two glass sheets.

The low-emissivity systems may also comprise several reflective metal layers. The gain in terms of low-emissivity properties is relatively limited with respect to the best systems that comprise only one metal layer. The benefit of the plurality of metal layers lies essentially in a better control of the reflection of visible wavelengths, and consequently of the neutrality in reflection.

Conventional insulating glazings under optimized conditions have, for example, systems of layers such as those described in the publication WO 2009/097513, and that especially have the structure:

glass/TiO$_2$/TiO$_2$—ZrO$_2$/ZnO/Ag/TiOx/ZnO/SnO$_2$.

A sheet of clear glass having a thickness of 3.45 mm coated with this system of layers, comprising a 12 nm silver layer, may achieve an emissivity of 0.01. A double glazing of two 3.85 mm glass sheets, one being coated with the preceding layer, the two sheets separated by 15 mm, the space between these sheets being filled with 90% argon, makes it possible to achieve a thermal transmission coefficient U, defined according to the EN 673 standard, of at best 1.0 and a light transmission of 70%, with a solar factor, according to the EN 410 standard, of 50%.

The most common pyrolytic "low-e" (low emissivity) systems comprise a layer of doped tin oxide, deposited on a first layer having the role of neutralizing the color in reflection. The layer in contact with the glass is ordinarily a layer of silica (or of silicon oxycarbide) optionally modified by additives. The layers of tin oxide, compared to the systems deposited by sputtering, are relatively thick, more than 200 nm, and for some of them more than 450 nm. These thick layers are strong enough to withstand being exposed to mechanical and/or chemical tests. Unlike the layers deposited by sputtering, they are not necessarily enclosed in a double glazing. Their performances as regards emissivity are much lower than those of the layers deposited by sputtering and comprising a metal layer. The U coefficients for the highest performing are of the order of 0.15 or at best 0.10. For this reason, the pyrolytic layers are not desired for glazings which must achieve extreme emissivities.

The performances of this double glazing are listed in table 1, example 1.

Figure 2:
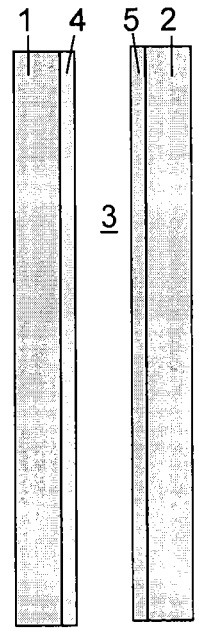
FIG. 2 is a view of a structure that does not correspond to the invention, given by way of comparison.

FIG. 2 presents a glazing used by way of comparison. It comprises, for a double glazing still with sheets of 3.85 mm thickness separated by 15 mm, the space being filled with argon (90%), the combination of two systems (4, 5) of layers respectively of the type obtained by sputtering and by pyrolysis. The layers are positioned in the space between the two glass sheets (1, 2) respectively in positions 2 and 3.

For the pyrolytic low-e, the layer used consists of a layer of tin oxide doped with fluorine (2 at %) having a thickness of 470 nm. This layer rests on a layer of silicon oxycarbide SiOxCy having a thickness of 75 nm. Individually, the emissivity of this system deposited on a 4 mm glass sheet is established at 0.10. The layer obtained by sputtering is the same as that indicated above with respect to FIG. 1.

The performances are listed in table 1, example 2.

In one variant, the position of the two layers is inverted. The results are not modified (example 2').

Figure 3:
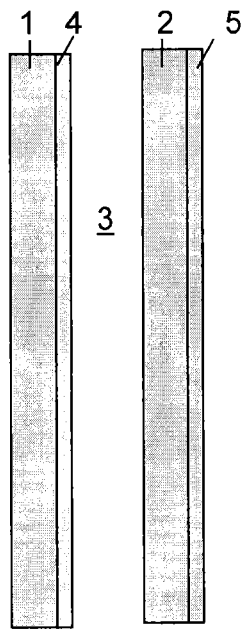
FIG. 3 is a structure of another comparative example.

The structure from FIG. 3 shows, by way of comparison, a double glazing in which the two layers are also each on one of the two sheets of the glazing, the pyrolytic layer (5) being in position 4. The layers are those presented previously. The results are those listed in example 3 of table 1.

Figure 4:
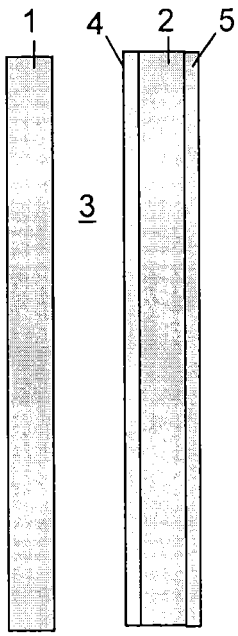
FIG. 4 is a view of a glazing according to the invention.

FIG. 4 corresponds to a configuration of a glazing according to the invention, still for two glass sheets having a thickness of 3.85 mm separated by 15 mm and a filling with 90% argon. The pyrolytic layers and those deposited by sputtering are positioned respectively at position 4 and 3. The hard pyrolytic system therefore remains exposed to the outside whilst the system of layers deposited by sputtering is protected in the space between the two glass sheets. The composition of the layers is that indicated previously.

The properties are those indicated in example 4 of table 1.

TABLE 1

| Example | TL | Rext. | TE | RE | AE | g | TL/g | U |
|---|---|---|---|---|---|---|---|---|
| 1 | 70 | 20 | 41 | 38 | 21 | 50 | 1.40 | 1.0 |
| 2 | 62 | 24 | 36 | 39 | 25 | 43 | 1.44 | 1.0 |
| 2' | 62 | 20 | 36 | 28 | 36 | 44 | 1.41 | 1.0 |
| 3 | 62 | 23 | 36 | 39 | 25 | 43 | 1.44 | 0.9 |
| 4 | 62 | 21 | 36 | 38 | 26 | 49 | 1.26 | 0.9 |

The properties of visible transmission, TL, and of reflection toward the outside, Rext., are given for an illuminant D65 under 2°. The energy properties in transmission, TE, in reflection, RE, in absorption, AE, and the solar factor, g, are measured according to the EN410 standard. The ratio TL/g is a measure of the selectivity of the glazing. The thermal transmission coefficient U, is expressed in $W/m^2 \cdot K$.

The arrangement according to the invention of the two systems of layers on the same sheet results in an identical thermal transmission coefficient for examples 3 and 4, but the solar factor is significantly increased by close to 15% in the case corresponding to the invention. These glazings are therefore particularly useful in regions where, in addition to a protection against heat losses, the benefit of the solar energy recovered is an important factor.

Double glazings have also been produced with thicker glass sheets. Each sheet has a thickness of 5.85 mm. The spacing between the sheets is maintained at 15 mm and the filling is again 90% argon.

The structures from the preceding examples are reproduced with the exception of those from examples 2 and 2'. The examples are numbered respectively 1a, 3a and 4a, only the last one corresponding to an embodiment according to the invention.

The properties of these examples are given in table 2.

TABLE 2

| Example | TL | Rext. | TE | RE | AE | g | TL/g | U |
|---------|----|-------|----|----|----|----|------|---|
| 1a | 68 | 20 | 39 | 34 | 27 | 49 | 1.39 | 1.0 |
| 3a | 61 | 23 | 34 | 36 | 30 | 42 | 1.45 | 0.9 |
| 4a | 61 | 21 | 34 | 35 | 31 | 48 | 1.27 | 0.9 |

As before, it is observed that the structure according to the invention makes it possible to simultaneously obtain an advantageous thermal transmission coefficient and a relatively high solar factor while retaining a high light transmission.

The invention claimed is:

1. A double glazing, comprising:
a first glass sheet having a first face 1 facing an outside of the double glazing and a second face 2 facing an interior of the double glazing; and
a second glass sheet comprising a first low-emissivity layer on a first face 3 facing the interior of the double glazing and a second low-emissivity layer on a second face 4 opposite the first face 3,
wherein the first low-emissivity layer comprises a sputtering layer comprising an infrared-reflecting metal layer produced by sputtering,
wherein the second low-emissivity layer comprises a pyrolytic layer of tin oxide doped with antimony or fluorine deposited by gas pyrolysis,
wherein the double glazing has a light transmission of not less than 60% for thicknesses of the clear glass sheets of 4 mm,
wherein at least one of the group consisting of a layer of SiOxCy, a set of layers of $TiO_2.SiO_2$, and a set of layers of $SnO_2.SiO_2$, is interposed between the second face 4 and the pyrolitic layer,
wherein at least one protection layer is interposed between the sputtering layer and the first face 3,
wherein the pyrolytic layer has a thickness of not less than 200 nm and a surface roughness Ra of less than 10 nm, and
wherein the double glazing has a haze of less than 0.3%.

2. The glazing of claim 1, having a solar factor of at least 45% for a thicknesses of the clear glass sheets of 4 mm.

3. The glazing of claim 1, wherein the pyrolytic layer is such that the 4 mm second clear glass sheet, coated with the pyrolitic layer, has an emissivity of at most 0.20.

4. The glazing of claim 1, wherein the sputtering layer is such that the 4 mm second clear glass sheet, coated with the sputtering layer, has an emissivity of at most 0.01.

5. The glazing of claim 4, wherein the sputtering layer comprises a silver-based layer having a thickness of between 10 and 15 nm.

6. The glazing of claim 1, wherein a space between the first and the second glass sheets is filled with a gas having a low thermal conductivity.

7. The glazing of claim 1, wherein the glazing has a U coefficient of at most 0.9.

8. The glazing of claim 1, wherein the glazing has, in a CIELAB system under an illuminant D65 and under 2°, reflection colorimetric coordinates such that:

$$-6 \leq a^* \leq 3$$

$$-6 \leq b^* \leq 3.$$

9. The glazing of claim 1, wherein the protection layer comprises a material selected from the group consisting of $SiO_2$, $Si_3N_4$, tin oxide, and an oxide of a zinc/tin alloy.

10. The glazing of claim 1, wherein the pyrolytic layer is an outermost layer of the second face 4.

11. The glazing of claim 1, wherein a layer of SiOxCy is interposed between the second face 4 and the pyrolytic layer.

12. The glazing of claim 1, wherein a set of layers of $TiO_2.SiO_2$ is interposed between the second face 4 and the pyrolytic layer.

13. A double glazing, comprising:
a first glass sheet having a first face 1 facing an outside of the double glazing and a second face 2 facing an interior of the double glazing; and
a second glass sheet comprising a first low-emissivity layer on a first face 3 facing the interior of the double glazing and a second low-emissivity layer on a second face 4 opposite the first face 3,
wherein the first low-emissivity layer comprises a sputtering layer comprising an infrared-reflecting metal layer produced by sputtering,
wherein the second low-emissivity layer comprises a pyrolytic layer of tin oxide doped with antimony or fluorine deposited by gas pyrolysis,
wherein the double glazing has a light transmission of not less than 60% for thicknesses of the clear glass sheets of 4 mm,
wherein the pyrolytic layer has a thickness of not less than 200 nm and a surface roughness Ra of less than 10 nm, and
wherein the double glazing has a haze of less than 0.3%.

14. The glazing of claim 13, having a solar factor of at least 45% for a thicknesses of the clear glass sheets of 4 mm.

15. The glazing of claim 13, wherein the pyrolytic layer is such that the 4 mm second clear glass sheet, coated with the pyrolitic layer, has an emissivity of at most 0.20.

16. The glazing of claim 13, wherein the sputtering layer is such that the 4 mm second clear glass sheet, coated with the sputtering layer, has an emissivity of at most 0.01.

17. The glazing of claim 16, wherein the sputtering layer comprises a silver-based layer having a thickness of between 10 and 15 nm.

18. The glazing of claim 13, wherein a space between the first and the second glass sheets is filled with a gas having a low thermal conductivity.

19. The glazing of claim 13, wherein the glazing has a U coefficient of at most 0.9.

20. The glazing of claim 13, wherein the glazing has, in a CIELAB system under an illuminant D65 and under 2°, reflection colorimetric coordinates such that:

$-6 \leq a^* \leq 3$ $-6 \leq b^* \leq 3$.

* * * * *